(12) United States Patent
Ho et al.

(10) Patent No.: US 8,675,318 B1
(45) Date of Patent: Mar. 18, 2014

(54) METHOD AND SYSTEM FOR PROVIDING A READ TRANSDUCER HAVING A REDUCED SHIELD-TO-SHIELD SPACING

(75) Inventors: Kuok San Ho, Emerald Hills, CA (US); Savas Gider, San Jose, CA (US); Daniele Mauri, San Jose, CA (US); Ming Mao, Dublin, CA (US); Sining Mao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 48 days.

(21) Appl. No.: 13/302,994

(22) Filed: Nov. 22, 2011

(51) Int. Cl.
*G11B 5/39* (2006.01)
(52) U.S. Cl.
USPC .................................. 360/324.11; 360/324.12
(58) Field of Classification Search
CPC ............ H01F 10/3254; H01F 10/3272; H01F 10/3268; H01F 10/3263; G11B 5/313; G11B 5/3903; G11B 5/3909; G11B 5/3932; G11B 5/398; G11B 5/39
USPC .......... 360/319, 324.1, 324.11, 324.12, 324.2
See application file for complete search history.

(56) References Cited

U.S. PATENT DOCUMENTS

| | | | |
|---|---|---|---|
| 5,612,098 A | 3/1997 | Tan et al. | |
| 5,717,550 A | 2/1998 | Nepela et al. | |
| 5,828,530 A | 10/1998 | Gill et al. | |
| 5,876,848 A | 3/1999 | Tan et al. | |
| 5,898,547 A * | 4/1999 | Fontana et al. | 360/324.2 |
| 6,219,205 B1 | 4/2001 | Yuan et al. | |
| 6,456,465 B1 | 9/2002 | Louis et al. | |
| 6,466,419 B1 | 10/2002 | Mao | |
| 6,597,546 B2 | 7/2003 | Gill | |
| 6,631,055 B2 | 10/2003 | Childress et al. | |
| 6,680,828 B2 | 1/2004 | Gill | |
| 6,680,830 B2 | 1/2004 | Gill | |
| 6,724,584 B2 | 4/2004 | Mack et al. | |
| 6,738,236 B1 | 5/2004 | Mao et al. | |
| 6,738,237 B2 | 5/2004 | Gill | |
| 6,741,432 B2 | 5/2004 | Pinarbasi | |
| 6,744,607 B2 | 6/2004 | Freitag et al. | |
| 6,751,845 B2 | 6/2004 | Gill | |
| 6,781,798 B2 | 8/2004 | Gill | |
| 6,785,102 B2 | 8/2004 | Freitag et al. | |
| 6,801,412 B2 | 10/2004 | Gill | |
| 6,833,982 B2 | 12/2004 | Jayasekara | |
| 6,847,510 B2 * | 1/2005 | Childress et al. | 360/324.2 |
| 6,856,493 B2 | 2/2005 | Pinarbasi | |
| 6,859,348 B2 | 2/2005 | Pinarbasi | |
| 6,865,062 B2 | 3/2005 | Pinarbasi | |
| 6,867,952 B2 | 3/2005 | Hasegawa | |
| 6,867,953 B2 | 3/2005 | Gill | |
| 6,901,652 B2 | 6/2005 | Hasegawa et al. | |
| 6,933,042 B2 | 8/2005 | Gill | |
| 6,943,997 B2 * | 9/2005 | Gill | 360/324.12 |
| 6,947,264 B2 | 9/2005 | Gill | |
| 6,983,530 B2 | 1/2006 | Gill | |

(Continued)

*Primary Examiner* — Brian Miller

(57) ABSTRACT

A method and system for providing a read magnetic transducer having an air-bearing surface (ABS) is described. The magnetic read transducer includes a first shield, a read sensor stack, an antiferromagnetic (AFM) tab, and a second shield. The read sensor stack includes a pinned layer, a spacer layer, and a free layer. The spacer layer is nonmagnetic and between the pinned layer and the free layer. A portion of the read sensor stack is at the ABS. The AFM tab is recessed from the ABS and adjacent to a portion of the pinned layer. The read sensor resides between the first shield and the second shield.

20 Claims, 8 Drawing Sheets

(56) References Cited

U.S. PATENT DOCUMENTS

| | | | |
|---|---|---|---|
| 7,016,168 B2 | 3/2006 | Li et al. | |
| 7,035,059 B2 | 4/2006 | Gill | |
| 7,035,062 B1 * | 4/2006 | Mao et al. | 360/324.2 |
| 7,037,847 B2 | 5/2006 | Le et al. | |
| 7,038,889 B2 | 5/2006 | Freitag et al. | |
| 7,050,277 B2 | 5/2006 | Gill et al. | |
| 7,072,154 B2 | 7/2006 | Gill et al. | |
| 7,082,017 B2 | 7/2006 | Freitag et al. | |
| 7,092,220 B2 | 8/2006 | Gill et al. | |
| 7,092,221 B2 | 8/2006 | Gill | |
| 7,094,130 B2 | 8/2006 | Cyrille et al. | |
| 7,161,773 B2 | 1/2007 | Fontana, Jr. et al. | |
| 7,171,741 B2 | 2/2007 | Gill | |
| 7,177,120 B2 | 2/2007 | Freitag et al. | |
| 7,196,878 B2 | 3/2007 | Fox et al. | |
| 7,212,384 B1 | 5/2007 | Stoev et al. | |
| 7,220,499 B2 | 5/2007 | Saito et al. | |
| 7,245,463 B2 | 7/2007 | Gill | |
| 7,248,447 B2 | 7/2007 | Gill | |
| 7,265,946 B2 | 9/2007 | Gill | |
| 7,268,980 B2 | 9/2007 | Gill | |
| 7,280,325 B1 | 10/2007 | Pan | |
| 7,313,856 B2 | 1/2008 | Gill | |
| 7,324,310 B2 | 1/2008 | Gill | |
| 7,330,339 B2 | 2/2008 | Gill | |
| 7,345,854 B2 * | 3/2008 | Takano | 360/324.12 |
| 7,365,949 B2 | 4/2008 | Hayakawa et al. | |
| 7,369,371 B2 | 5/2008 | Freitag et al. | |
| 7,370,404 B2 | 5/2008 | Gill et al. | |
| 7,372,674 B2 | 5/2008 | Gill | |
| 7,382,589 B2 | 6/2008 | Lin et al. | |
| 7,405,908 B2 | 7/2008 | Gill | |
| 7,405,909 B2 | 7/2008 | Gill | |
| 7,419,610 B2 | 9/2008 | Cyrille et al. | |
| 7,420,787 B2 | 9/2008 | Freitag et al. | |
| 7,420,788 B2 | 9/2008 | Pinarbasi | |
| 7,436,637 B2 | 10/2008 | Pinarbasi | |
| 7,436,638 B1 | 10/2008 | Pan | |
| 7,463,459 B2 | 12/2008 | Ding et al. | |
| 7,466,524 B2 | 12/2008 | Freitag et al. | |
| 7,469,465 B2 | 12/2008 | Ding et al. | |
| 7,522,391 B2 | 4/2009 | Freitag et al. | |
| 7,522,392 B2 | 4/2009 | Carey et al. | |
| 7,580,230 B2 | 8/2009 | Freitag et al. | |
| 7,599,155 B2 | 10/2009 | Saito et al. | |
| 7,602,589 B2 | 10/2009 | Freitag et al. | |
| 7,616,411 B2 | 11/2009 | Gill | |
| 7,652,856 B2 | 1/2010 | Pinarbasi | |
| 7,663,846 B2 | 2/2010 | Freitag et al. | |
| 7,676,905 B2 | 3/2010 | Pinarbasi | |
| 7,697,242 B2 | 4/2010 | Gill | |
| 7,800,867 B2 | 9/2010 | Saito et al. | |
| 7,916,435 B1 | 3/2011 | Gill | |
| 7,961,440 B2 * | 6/2011 | Gill et al. | 360/324.11 |
| 8,068,317 B2 | 11/2011 | Gill | |
| 8,104,166 B1 | 1/2012 | Zhang et al. | |
| 8,149,548 B2 * | 4/2012 | Hatatani et al. | 360/324.12 |
| 8,233,248 B1 | 7/2012 | Li et al. | |
| 8,266,785 B2 | 9/2012 | Freitag et al. | |
| 8,318,030 B2 | 11/2012 | Peng et al. | |
| 8,333,898 B2 | 12/2012 | Brown et al. | |
| 8,343,319 B1 | 1/2013 | Li et al. | |
| 8,400,738 B2 * | 3/2013 | Covington et al. | 360/324.12 |
| 8,531,801 B1 | 9/2013 | Xiao et al. | |
| 2002/0131219 A1 * | 9/2002 | Mack et al. | 360/324.12 |
| 2003/0123198 A1 | 7/2003 | Sugawara et al. | |
| 2003/0179520 A1 | 9/2003 | Hasegawa | |
| 2004/0061983 A1 | 4/2004 | Childress et al. | |
| 2004/0166368 A1 | 8/2004 | Gill et al. | |
| 2006/0023375 A1 * | 2/2006 | Gill | 360/324.11 |
| 2006/0092582 A1 | 5/2006 | Gill et al. | |
| 2006/0230601 A1 | 10/2006 | Gill et al. | |
| 2006/0232893 A1 | 10/2006 | Gill et al. | |
| 2006/0285259 A1 | 12/2006 | Gill et al. | |
| 2008/0180863 A1 | 7/2008 | Gill | |
| 2009/0086385 A1 | 4/2009 | Gill et al. | |
| 2009/0316308 A1 | 12/2009 | Saito et al. | |
| 2010/0232072 A1 | 9/2010 | Dimitrov et al. | |
| 2011/0228428 A1 | 9/2011 | Dimitrov et al. | |
| 2012/0134057 A1 * | 5/2012 | Song et al. | 360/319 |
| 2012/0276415 A1 * | 11/2012 | Sapozhnikov et al. | 428/831 |
| 2013/0082696 A1 | 4/2013 | Le et al. | |
| 2013/0092654 A1 | 4/2013 | Balamane et al. | |

\* cited by examiner

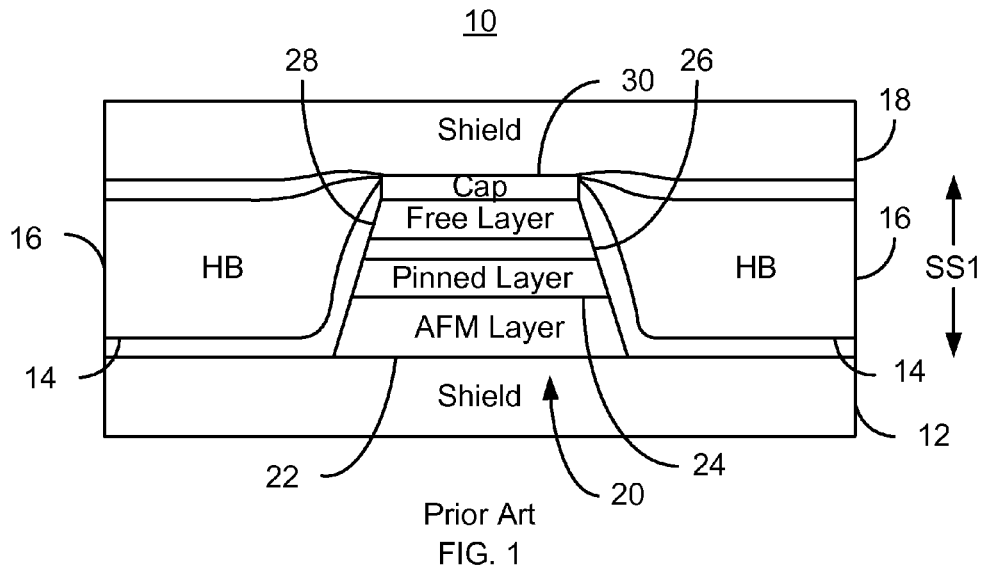
Prior Art
FIG. 1
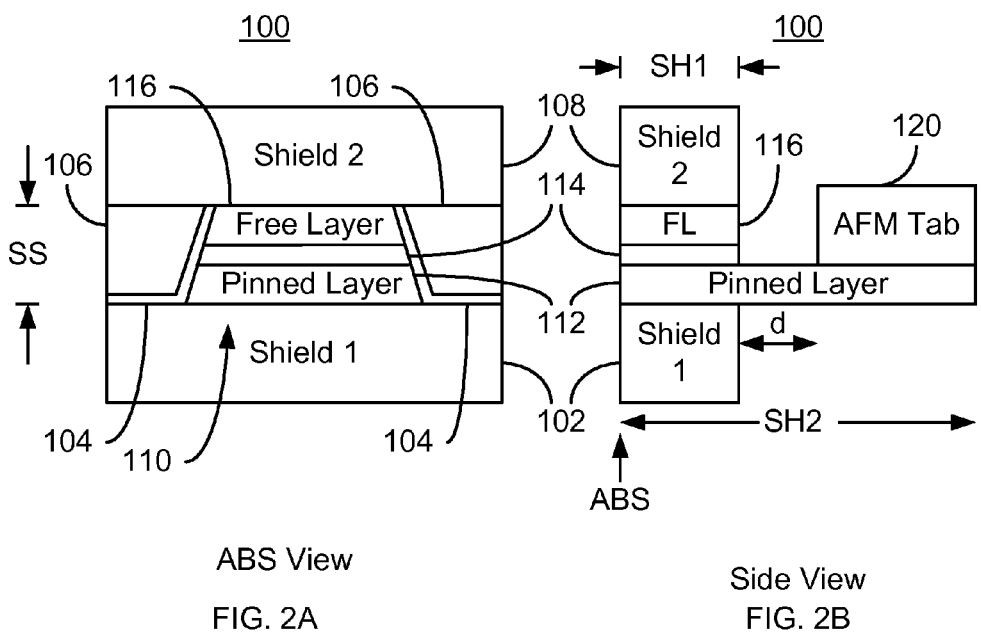
ABS View
FIG. 2A
Side View
FIG. 2B

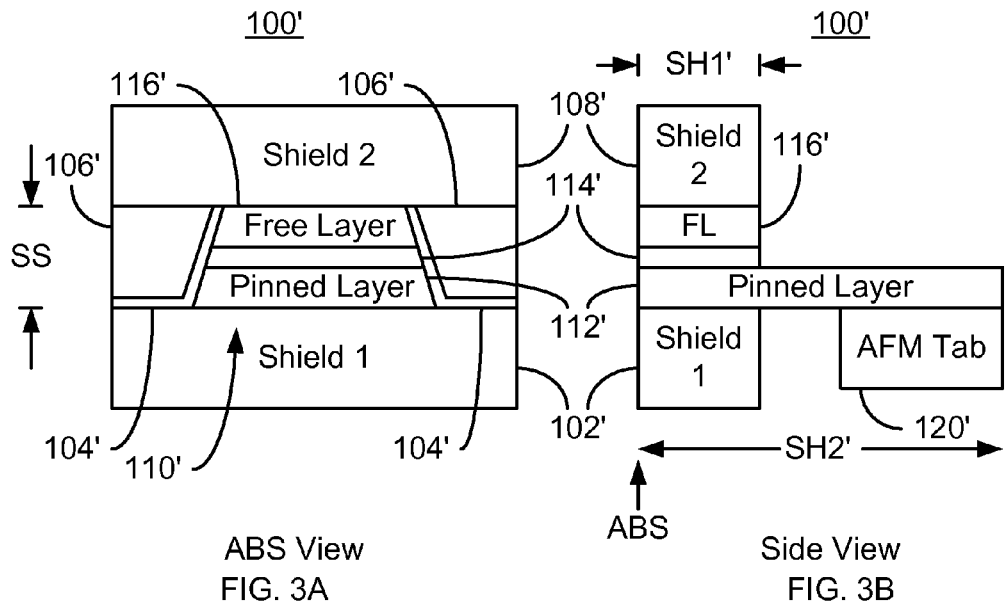
ABS View
FIG. 3A
Side View
FIG. 3B
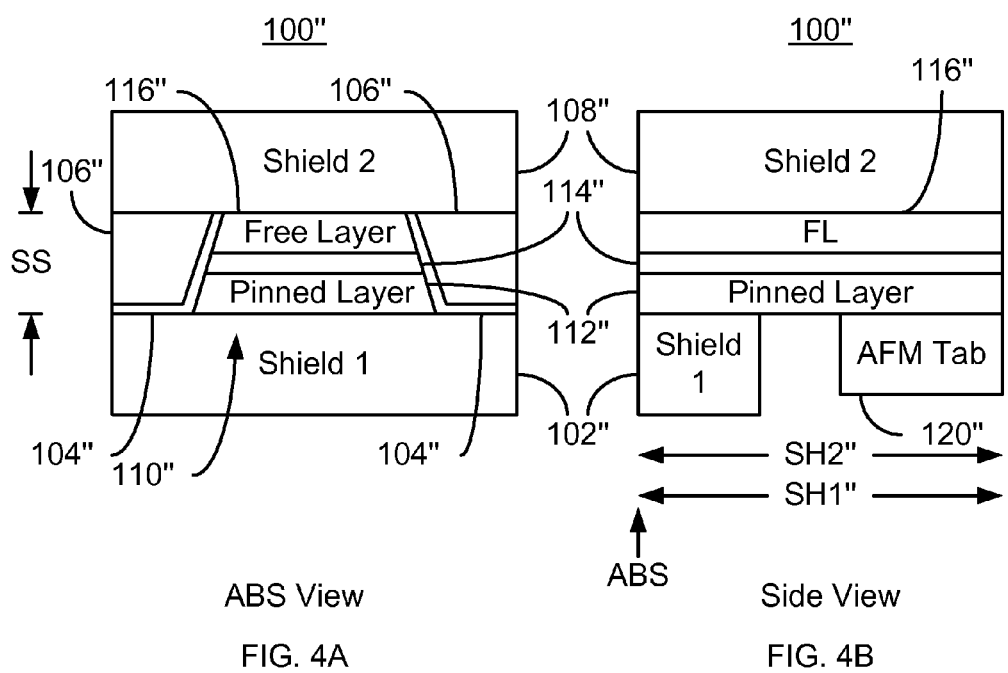
ABS View
FIG. 4A
Side View
FIG. 4B

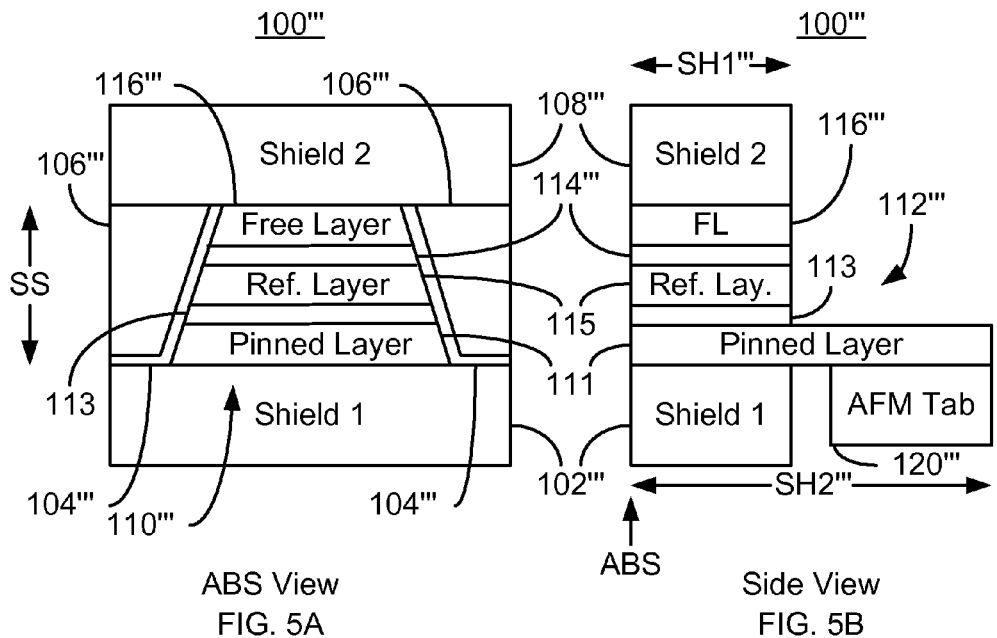
ABS View
FIG. 5A
Side View
FIG. 5B
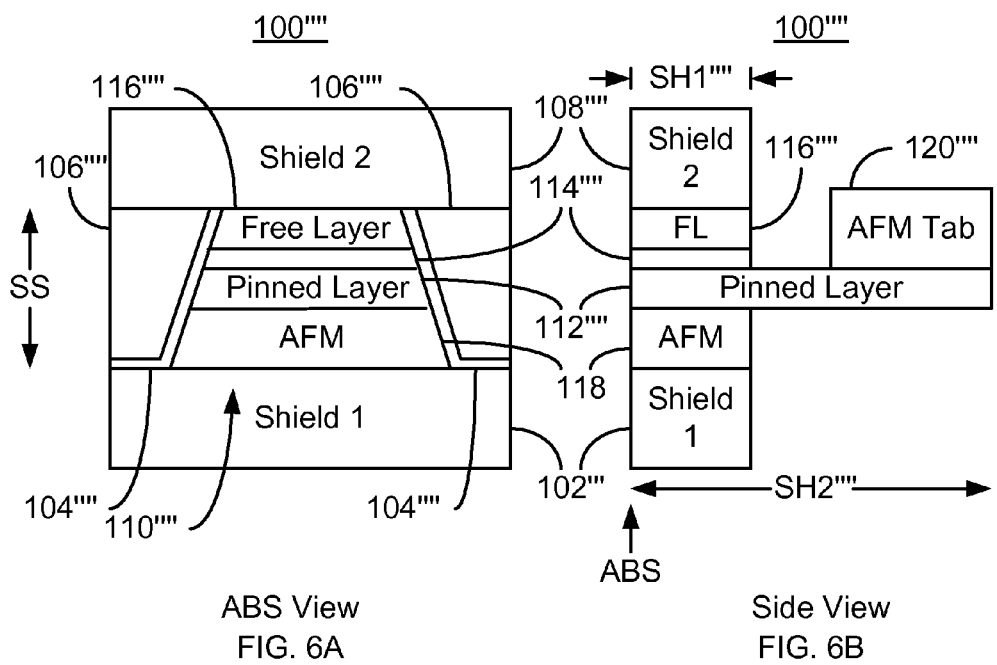
ABS View
FIG. 6A
Side View
FIG. 6B

METHOD AND SYSTEM FOR PROVIDING A READ TRANSDUCER HAVING A REDUCED SHIELD-TO-SHIELD SPACING

BACKGROUND

FIG. 1 depicts an air-bearing surface (ABS) view of a conventional read transducer used in magnetic recording technology applications. The conventional read transducer 10 includes shields 12 and 18, insulator 14, hard bias structures 16, and sensor 20. The read sensor 20 is typically a giant magnetoresistive (GMR) sensor or tunneling magnetoresistive (TMR) sensor. The read sensor 20 includes an antiferromagnetic (AFM) layer 22, a pinned layer 24, a nonmagnetic spacer layer 26, and a free layer 28. Also shown is a capping layer 30. In addition, seed layer(s) may be used. The free layer 28 has a magnetization sensitive to an external magnetic field. Thus, the free layer 28 functions as a sensor layer for the magnetoresistive sensor 20. If the sensor 20 is to be used in a current perpendicular to plane (CPP) configuration, then current is driven in a direction substantially perpendicular to the plane of the layers 22, 24, 26, and 28. Conversely, in a current parallel to plane (CIP) configuration, then conductive leads (not shown) would be provided on the hard bias structures 16. The hard bias structures 16 are used to magnetically bias the free layer 28. In an ideal case, the hard bias structures 16 match the thickness, moment, and location of the sensor layer 12.

Although the conventional transducer 10 functions, there are drawbacks. The conventional transducer 10 has a shield-to-shield spacing of SS1. In general, the shield-to-shield spacing is desired to be reduced as higher density memories are to be read. For example, the shield-to-shield spacing for the conventional read transducer 10 may be approximately twenty-two nanometers. Of this shield-to-shield spacing, approximately one-third is occupied by the AFM layer 22. The thickness of the AFM layer 22 may be reduced slightly. However, such reductions in the thickness of the AFM layer 22 adversely affect the thermal stability of the magnetoresistive sensor 20. Such instabilities in the magnetoresistive sensor 20 are undesirable.

In other conventional sensors, the AFM layer 22 is omitted, resulting in a self-pinned sensor. Such self-pinned sensors use a synthetic antiferromagnetic (SAF) structure for the pinned layer 24. A SAF structure includes two ferromagnetic layers (a reference layer and a pinned layer) separated by a nonmagnetic spacer layer. The reference layer is typically closer to the free layer than the pinned layer. Typically, the ferromagnetic layers are antiferromagnetically aligned. The self-pinned sensors rely on the magnetic coupling between the layers of the SAF for stability. However, the SAF is stable with the magnetization of the reference layer in one of two states. For example, if the pinned layer 24 were a SAF structure, the reference layer may be stable with its magnetization pointing to the left or right edge of the page. Consequently, the SAF structure may be vulnerable to reversal during use in a disk drive. Such a reversal is highly undesirable.

Accordingly, what is needed is a system and method for reducing the shield-to-shield spacing of a magnetic recording read transducer.

BRIEF SUMMARY OF THE INVENTION

A method and system for providing a read magnetic transducer having an air-bearing surface (ABS) is described. The magnetic read transducer includes a first shield, a read sensor stack, an antiferromagnetic (AFM) tab, and a second shield. The read sensor stack includes a pinned layer, a spacer layer, and a free layer. The spacer layer is nonmagnetic and between the pinned layer and the free layer. A portion of the read sensor stack is at the ABS. The AFM tab is recessed from the ABS and adjacent to a portion of the pinned layer. The read sensor is between the first shield and the second shield.

BRIEF DESCRIPTION OF SEVERAL VIEWS OF THE DRAWINGS

FIG. 1 depicts an ABS view of a conventional magnetic recording read transducer.

FIGS. 2A-2B depicts ABS and plan views of an exemplary embodiment of a portion of a magnetic recording read transducer.

FIGS. 3A-3B depicts ABS and plan views of another exemplary embodiment of a portion of a magnetic recording read transducer.

FIGS. 4A-4B depicts ABS and plan views of another exemplary embodiment of a portion of a magnetic recording read transducer.

FIGS. 5A-5B depicts ABS and plan views of another exemplary embodiment of a portion of a magnetic recording read transducer.

FIGS. 6A-6B depicts ABS and plan views of another exemplary embodiment of a portion of a magnetic recording read transducer.

DETAILED DESCRIPTION OF THE PREFERRED EMBODIMENTS

Figure 7:
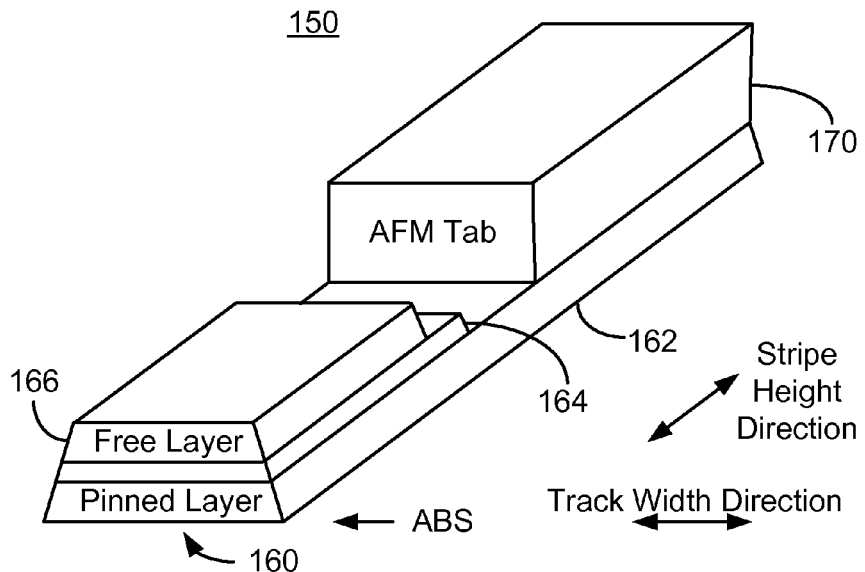
FIG. 7 is a perspective view of an exemplary embodiment of a portion of a magnetic recording read transducer.

FIGS. 2A-2B depict ABS and side views of an exemplary embodiment of a portion of a magnetic read transducer 100. For clarity, FIGS. 2A-2B are not to scale. The read transducer 100 may be part of a read head or may be part of a merged head that also includes a write transducer. The head of which the read transducer 100 is a part is part of a disk drive having a media, a slider and the head coupled with the slider. Further, only a portion of the components of the read transducer 100 are depicted.

The transducer 100 includes soft magnetic shields 102 and 108, insulator 104, biasing layers 106, and a read sensor 110. The sensor 110 includes a pinned layer 112, a nonmagnetic spacer layer 114, and a free layer 116. The pinned layer 112 and free layer 116 are ferromagnetic. However, the magnetization of the pinned layer 112 is stable, while that of the free layer 116 may respond to an external magnetic field. The pinned layer 112 is shown as a single layer. However, in some embodiments, the pinned layer 112 may be a multilayer including but not limited to a SAF structure. The free layer 116 is shown as a single layer, but may be a multilayer including but not limited to a SAF structure. The nonmagnetic spacer layer 114 may be a conductor, an insulator such as a tunneling barrier layer, or other similar structure. In some embodiments, therefore, the sensor 110 is a GMR or TMR sensor. However, in the embodiment shown, there is no pinning layer at the ABS. In other embodiments, such a pinning layer may be included.

The magnetoresistive read transducer also includes an AFM tab 120. The AFM tab 120 is adjacent to the pinned layer 112 and recessed from the ABS. The AFM tab 120 is shown on the pinned layer 112. However, in another embodiment, the AFM tab 120 may be below the pinned layer 112. In some embodiments, the AFM tab 120 is recessed from the ABS by at least ten nanometers. In other embodiments, the AFM tab 120 may be recessed by at least fifty nanometers. The AFM tab 120 may have sufficient volume for thermal stability as well as to perform the desired functions. In some embodiments, for example, the thickness of the AFM tab 120 may be at least fifty Angstroms. The AFM tab 120 may also be spaced apart from the back edge of the free layer 116 by a distance, d. In some embodiments, d is at least twenty and not more than forty nanometers. However, in other embodiments, d may vary.

The AFM tab 120 is used to stabilize the pinned layer 112. Although termed an AFM tab, in some embodiments, a material other than an AFM material might be used. In some embodiments, the AFM tab 120 may have sufficient volume and pinning strength to pin the magnetization of the pinned layer 112 in the desired direction. However, in the embodiment shown in FIG. 2B, the pinned layer 112 is extended beyond the free layer 116 in the stripe height direction. More specifically, the free layer 116 has a stripe height, SH1, that is significantly less than the stripe height, SH2, of the pinned layer 112. Furthermore, the aspect ratio of the pinned layer 12 (stripe height SH2 divided by track width) may be greater than two. As a result, the pinned layer 112 may not require pinning by the AFM tab 120. For example, a pinned layer 112 that is a SAF structure may be stable. In such embodiments, the AFM tab 120 may simply function to prevent the pinned layer 112 from being reversed during use and/or manufacturing (e.g. due to lapping). In some such embodiments, the AFM tab 120 may also act to restore the pinned layer 112 to its desired state if the pinned layer 112 undergoes an undesired reversal. However, as described above, in some embodiments, the AFM tab 120 can act to pin the magnetization of the pinned layer 112.

Using the AFM tab 120, the pinned layer 112 can be made thermally stable. The AFM tab 120 may also not only stabilize the magnetization of the pinned layer 112 against reversal, but may also allow the desired state of the magnetization to be restored. In some embodiments, the AFM tab 120 may have sufficient volume and coupling to the pinned layer 112 to pin the magnetization of the pinned layer 112. The pinned layer 112 may be stabilized in the desired direction. This may be achieved with a reduced shield-to-shield spacing, SS. The reduction in the shield-to-shield spacing may be achieved at least in part because the pinning may be omitted at the ABS. For example, in some embodiments, the shield-to-shield spacing may be as low as sixteen nanometers. In some such embodiments, the shield-to-shield spacing may be as low as thirteen nanometers. In other embodiments, a different shield-to-shield spacing (lower or higher) may be achieved. Thus, a read transducer 100 suitable for use at higher magnetic recording densities may be provided.

FIGS. 3A and 3B depict ABS and plan views, respectively, of an exemplary embodiment of a portion of a magnetic read transducer 100'. For clarity, FIGS. 3A-3B are not to scale. The read transducer 100' may be part of a read head or may be part of a merged head that also includes a write transducer. The head of which the read transducer 100' is a part is part of a disk drive having a media, a slider and the head coupled with the slider. Further, the magnetic read transducer 100' corresponds to the magnetic read transducer 100. Similar components have analogous labels. The magnetic transducer 100' includes shields 102' and 108', nonmagnetic insulating layer 104', sensor 110' having pinned layer 112', nonmagnetic spacer layer 114', and free layer 116', bias layers 106', and AFM tab 120' that correspond to shields 102 and 108, nonmagnetic insulating layer 104, sensor 110 having pinned layer 112, nonmagnetic spacer layer 114, and free layer 116, bias layers 106, and AFM tab 120, respectively. Thus, the components 102', 104', 106', 108', 110', 112', 114', 116', and 120' have a similar structure and function to the components, 102, 104, 106, 108, 110, 112, 114, 116, and 120, respectively.

The AFM tab 120' is shown as residing below the pinned layer 112'. Thus, in the embodiment shown, the pinned layer 112' may be fabricated on the AFM tab 120'. However, in another embodiment, the AFM tab 120' may be above the pinned layer 112'. The AFM tab 120' is also adjacent to the pinned layer 112' and recessed from the ABS. The geometry and function of the AFM tab 120' may be analogous to that of the AFM tab 120. In some embodiments, the AFM tab 120' is recessed from the ABS a distance analogous to the AFM tab 120. The AFM tab 120' may have sufficient volume for thermal stability as well as to perform the desired functions.

The AFM tab 120' is used to stabilize the pinned layer 112'. Although termed an AFM tab, in some embodiments, a material other than an AFM material might be used. In some embodiments, the AFM tab 120' may have sufficient volume and pinning strength to pin the magnetization of the pinned layer 112' in the desired direction. However, in the embodiment shown in FIG. 3B, the pinned layer 112' is extended beyond the free layer 116' in the stripe height direction. More specifically, the free layer 116' has a stripe height, SH1', that is significantly less than the stripe height, SH2', of the pinned layer 112'. Furthermore, the aspect ratio of the pinned layer 112' (stripe height SH2 divided by track width) may be greater than two. As a result, the pinned layer 112' may not require pinning by the AFM tab 120'. In some embodiments, therefore, the AFM tab 120' may simply function to prevent the pinned layer 112' from being reversed during use and/or fabrication. The AFM tab 120' may also restore the pinned layer 112' to its desired state if the pinned layer 112' undergoes an undesired reversal.

The transducer 100' shares the benefits of the transducer 100. The pinned layer 112' can be made more thermally stable. The AFM tab 120' may not only stabilize the magnetization of the pinned layer 112' against reversal, but may also allow the desired state of the magnetization to be restored. In some embodiments, the AFM tab 120' may have sufficient volume and coupling to the pinned layer 112' to pin the magnetization of the pinned layer 112'. This stabilization may be achieved with a reduced shield-to-shield spacing, SS. For example, in some embodiments, the shield-to-shield spacing may be analogous to that described for the transducer 100. Thus, a read transducer 100' suitable for use at higher magnetic recording densities may be provided.

FIGS. 4A and 4B depict ABS and plan views, respectively, of an exemplary embodiment of a portion of a magnetic read transducer 100". For clarity, FIGS. 4A-4B are not to scale. The read transducer 100" may be part of a read head or may be part of a merged head that also includes a write transducer. The head of which the read transducer 100" is a part is part of a disk drive having a media, a slider and the head coupled with the slider. Further, the magnetic read transducer 100" corresponds to the magnetic read transducer 100 and 100'. Similar components have analogous labels. The magnetic transducer 100" includes shields 102" and 108", nonmagnetic insulating layer 104", sensor 110" having pinned layer 112", nonmagnetic spacer layer 114", and free layer 116", bias layers 106", and AFM tab 120" that correspond to shields 102/102' and 108/108', nonmagnetic insulating layer 104/104', sensor 110/110' having pinned layer 112/112', nonmagnetic spacer layer 114/114', and free layer 116/116', bias layers 106/106', and AFM tab 120/120', respectively. Thus, the components 102", 104", 106", 108", 110", 112", 114", 116", and 120" have a similar structure and function to the components, 102/102', 104/104', 106/106', 108/108', 110/110', 112/112', 114/114', 116/116', and 120/120', respectively.

The AFM tab 120" is shown as residing below the pinned layer 112", which does not extend further than the free layer 116" in the stripe height direction. Thus, in the embodiment shown, the pinned layer 112" may be fabricated on the AFM tab 120". However, in another embodiment, the AFM tab 120" may be above the pinned layer 112". The AFM tab 120" is also adjacent to the pinned layer 112" and recessed from the ABS. The geometry and function of the AFM tab 120" may be analogous to that of the AFM tabs 120 and/or 120'. In some embodiments, the AFM tab 120" is recessed from the ABS a distance analogous to the AFM tabs 120 and/or 120'. The AFM tab 120" may have sufficient volume for thermal stability as well as to perform the desired functions.

The AFM tab 120" is used to stabilize the pinned layer 112'. Although termed an AFM tab, in some embodiments, a material other than an AFM material might be used. In the embodiment shown, the AFM tab 120" may have sufficient volume and pinning strength to pin the magnetization of the pinned layer 112" in the desired direction. As can be seen in FIG. 4B, the stripe height of the pinned layer, SH2" is substantially the same as that of the free layer, SH1". As a result, the aspect ratio of the pinned layer may be less than 2. As a result, the AFM tab 120" may be desired to pin the magnetization of the pinned layer 112".

The transducer 100" may share the benefits of the transducers 100 and/or 100'. The pinned layer 112" can be made thermally stable. More specifically, the AFM tab 120" pins the magnetization of the pinned layer 112". This stabilization may be achieved with a reduced shield-to-shield spacing, SS. For example, in some embodiments, the shield-to-shield spacing may be analogous to that described for the transducers 100 and/or 100'. Thus, a read transducer 100" suitable for use at higher magnetic recording densities may be provided.

FIGS. 5A and 5B depict ABS and plan views, respectively, of an exemplary embodiment of a portion of a magnetic read transducer 100'''. For clarity, FIGS. 5A and 5B are not to scale. The read transducer 100''' may be part of a read head or may be part of a merged head that also includes a write transducer. The head of which the read transducer 100''' is a part is part of a disk drive having a media, a slider and the head coupled with the slider. Further, the magnetic read transducer 100''' corresponds to the magnetic read transducer 100, 100', and 100". Similar components have analogous labels. The magnetic transducer 100''' includes shields 102''' and 108''', nonmagnetic insulating layer 104''', sensor 110''' having pinned layer 112''', nonmagnetic spacer layer 114''', and free layer 116''', bias layers 106''', and AFM tab 120''' that correspond to shields 102/102'/102" and 108/108'/108", nonmagnetic insulating layer 104/104'/104", sensor 110/110'/110" having pinned layer 112/112'/112", nonmagnetic spacer layer 114/114'/114", and free layer 116/116'/116", bias layers 106/106'/106", and AFM tab 120/120'/120", respectively. Thus, the components 102''', 104''', 106''', 108''', 110''', 112''', 114''', 116''', and 120''' have a similar structure and function to the components, 102/102'/102", 104/104'/104", 106/106'/106", 108/108'/108", 110/110'/110", 112/112'/112", 114/114'/114", 116/116'/116", and 120/120'/120", respectively.

The AFM tab 120''' is shown as residing below the pinned layer 112'''. Thus, in the embodiment shown, the pinned layer 112''' may be fabricated on the AFM tab 120'''. However, in another embodiment, the AFM tab 120''' may be above the pinned layer 112'''. The AFM tab 120''' is also adjacent to the pinned layer 112''' and recessed from the ABS. The geometry and function of the AFM tab 120''' may be analogous to that of the AFM tab 120. In some embodiments, the AFM tab 120''' is recessed from the ABS a distance analogous to the AFM tab 120. The AFM tab 120''' may have sufficient volume for thermal stability as well as to perform the desired functions.

In addition, the pinned layer 112''' is explicitly shown as a SAF structure. Thus, the pinned layer 112''' includes ferromagnetic layers 111 and 115 separated by a nonmagnetic layer 113. The ferromagnetic layer 111 is a ferromagnetic pinned layer 111, while ferromagnetic layer 113 is a reference layer.

The AFM tab 120''' is used to stabilize the pinned layer 112'''. Although termed an AFM tab, in some embodiments, a material other than an AFM material might be used. In some embodiments, the AFM tab 120''' may have sufficient volume and pinning strength to pin the magnetization of the pinned layer 111 in the desired direction. However, in the embodiment shown in FIG. 5B, the pinned layer 112''' is extended beyond the free layer 116''' in the stripe height direction. In some embodiments, the pinned layer 112''' may have an aspect ratio greater than two. More specifically, the free layer 116''' has a stripe height, SH1''', that is significantly less than the stripe height, SH2''', of the pinned layer 111. Note that the reference layer 115 has a stripe height that is less than SH2'''. In the embodiment shown, the reference layer 115 has the same stripe height, SH1''', as the free layer 116'''. Similarly the nonmagnetic layer 113 is shown as having the same stripe height as the free layer 116". However, in other embodiments, the stripe heights of the reference layer 115 and/or the nonmagnetic layer 113 may differ from that of the free layer 116'''. Because the ferromagnetic pinned layer 111 has an extended stripe height and aspect ratio greater than 2, the pinned layer 112''' may not require pinning by the AFM tab 120'''. Instead, the pinned layer 112''' may be self-pinned due to the interaction between the ferromagnetic pinned layer 111 and the reference layer 113. Typically, the magnetizations of these layers 111 and 113 are antiferromagnetically aligned. As discussed previously, without more, the pinned layer 112''' may be stable in one of two states. However, the presence of the AFM tab 120''' may prevent the pinned layer 112''' from being reversed during use and/or fabrication. The AFM tab 120''' may also to restore the pinned layer 112''' to its desired state if the pinned layer 112''' undergoes an undesired reversal.

The transducer 100''' shares the benefits of the transducers 100, 100', and/or 100". The pinned layer 112''' can be made more thermally stable. The AFM tab 120''' may not only stabilize the magnetization of the pinned layer 112' against reversal, but may also allow the desired state of the magnetization to be restored. In some embodiments, the AFM tab 120" may, but need not, pin the magnetization of the pinned layer 112". This stabilization may be achieved with a reduced shield-to-shield spacing, SS. For example, in some embodiments, the shield-to-shield spacing may be analogous to that described for the transducer 100. Thus, a read transducer 100''' suitable for use at higher magnetic recording densities may be provided.

FIGS. 6A and 6B depict ABS and plan views, respectively, of an exemplary embodiment of a portion of a magnetic read transducer 100''''. For clarity, FIGS. 6A and 6B are not to scale. The read transducer 100'''' may be part of a read head or may be part of a merged head that also includes a write transducer. The head of which the read transducer 100'''' is a part is part of a disk drive having a media, a slider and the head coupled with the slider. Further, the magnetic read transducer 100'''' corresponds to the magnetic read transducer 100, 100', 100", and/or 100'''. Similar components have analogous labels. The magnetic transducer 100'''' includes shields 102'''' and 108'''', nonmagnetic insulating layer 104'''', sensor 110'''' having pinned layer 112'''', nonmagnetic spacer layer 114'''', and free layer 116'''', bias layers 106'''', and AFM tab 120'''' that correspond to shields 102/102'/102"/102''' and 108/108'/108"/108''', nonmagnetic insulating layer 104/104'/104"/104''', sensor 110/110'/110"/110''' having pinned layer 112/112'/112"/112''', nonmagnetic spacer layer 114/114'/114"/114''', and free layer 116/116'/116"/116''', bias layers 106/106'/106"/106''', and AFM tab 120/120'/120"/120''', respectively. Thus, the components 102'''', 104'''', 106'''', 108'''', 110'''', 112'''', 114'''', 116'''', and 120'''' have a similar structure and function to the components, 102/102'/102"/102''', 104/104'/104"/104''', 106/106'/106"/106''', 108/108'/108"/108''', 110/110'/110"/110''', 112/112'/112"/112''', 114/114'/114"/114''', 116/116'/116"/116''', and 120/120'/120"/120''', respectively.

The AFM tab 120'''' is shown as residing above the pinned layer 112''''. However, in another embodiment, the AFM tab 120'''' may be below the pinned layer 112''''. The AFM tab 120'''' is also adjacent to the pinned layer 112'''' and recessed from the ABS. The geometry and function of the AFM tab 120'''' may be analogous to that of the AFM tab 120. In some embodiments, the AFM tab 120'''' is recessed from the ABS a distance analogous to the AFM tab 120. The AFM tab 120'''' may have sufficient volume for thermal stability as well as to perform the desired functions.

In addition, the magnetoresistive sensor 110'''' includes a pinning layer 118 at the ABS. In some embodiments, the pinning layer 118 is an AFM layer 118. In the embodiment shown, the AFM layer 118 is distinct from the AFM tab 120'''', as is shown in FIG. 6B. However, in other embodiments in which AFM tab 120'''' is below the pinned layer 112''', the AFM tab 120'''' may be connected to the AFM 118. However, in such embodiments, the AFM layer 118 may be made thinner than in a conventional read sensor and/or may be separately tailored from the AFM tab 120''''. For example, the AFM layer 118 and the AFM tab 120'''' may have different thicknesses. The AFM tab 120'''' is shown as residing on the pinned layer 112''''. Thus, in other embodiments, the AFM tab 120'''' may be below the pinned layer 112''''. In addition, although shown as a single layer, the pinned layer 112 may be a multilayer. For example, the pinned layer 112 may be a SAF structure.

The AFM tab 120'''' is used in conjunction with the AFM layer 118 to stabilize the pinned layer 112''''. Although termed an AFM tab, in some embodiments, a material other than an AFM material might be used. In some embodiments, the AFM tab 120'''' may have sufficient volume and pinning strength such that the magnetization of the pinned layer 112''' in the desired direction. However, in the embodiment shown in FIG. 6B, the pinned layer 112'''' is extended beyond the free layer 116'''' in the stripe height direction. More specifically, the free layer 116'''' has a stripe height, SH1'''', that is less than the stripe height, SH2'''', of the pinned layer 112''''. Because the pinned layer 112'''' has an extended stripe height and may have an aspect ratio greater than 2, the pinned layer 112'''' may not require pinning by the AFM tab 120''''. Instead, the pinned layer 112'''' may be self-pinned. However, in the embodiment shown, AFM layer 118 as well as AFM tab 120'''' are used to stabilize the pinned layer 112''''.

The transducer 100'''' shares the benefits of the transducers 100, 100', 100", and/or 100'''. Although AFM 118 is used, the AFM 118 is not the only layer used to stabilize the pinned layer 112''''. Instead, the AFM tab 120'''' is also used. The thickness of the AFM layer 118 at the ABS may thus be reduced while allowing for the pinned layer 112'''' to be stabilized. This stabilization may thus be achieved with a reduced shield-to-shield spacing, SS. For example, in some embodiments, the shield-to-shield spacing may be analogous to that described for the transducer 100. Thus, a read transducer 100'''' suitable for use at higher magnetic recording densities may be provided. Thus, the read transducers 100, 100', 100", 100''', and/or 100'''' having a reduced shield-to-shield spacing and stable pinned layers may be provided. Although read transducers 100, 100', 100", 100''', and/or 100'''' having different features are shown, aspects of one or more of the transducers 100, 100', 100", 100''', and/or 100'''' may be combined. Thus, performance of the read transducers 100, 100', 100", 100''', and/or 100'''' may be improved.

FIG. 7 depicts a perspective view of an exemplary embodiment of a portion of a magnetic read transducer 150. For clarity, FIG. 7 is not to scale. The read transducer 150 may be part of a read head or may be part of a merged head that also includes a write transducer. The head of which the read transducer 150 is a part is part of a disk drive having a media, a slider and the head coupled with the slider. Further, only a portion of the components of the read transducer 150 are depicted. In particular, only the sensor 160 and AFM tab 170 are shown. However, the transducer typically includes shields (not shown), bias structures (not shown), and other components.

The transducer 150 includes read sensor 160 and AFM tab 170. The sensor 160 includes a pinned layer 162, a nonmagnetic spacer layer 164, and a free layer 166. The pinned layer 162 and free layer 166 are ferromagnetic. However, the magnetization of the pinned layer 162 is stable, while that of the free layer 166 may respond to an external magnetic field. The pinned layer 162 is shown as a single layer. However, in some embodiments, the pinned layer 162 may be a multilayer including but not limited to a SAF structure. The free layer 166 is shown as a single layer, but may be a multilayer including but not limited to a SAF structure. The nonmagnetic spacer layer 164 may be a conductor, an insulator such as a tunneling barrier layer, or other similar structure. In some embodiments, therefore, the sensor 160 is a GMR or TMR sensor. Further, the nonmagnetic layer 164 is shown as extending a different amount in the stripe height direction than the free layer 166 and pinned layer 162. However, in other embodiments, the nonmagnetic spacer layer 164 may extend the same amount in the stripe height direction as the free layer 166 and/or the pinned layer 162. In the embodiment shown, there is no pinning layer at the ABS. In other embodiments, such a pinning layer may be included. Further, the transducer 150 is also analogous to the transducers 100, 100', 100", 100''', and/or 100''''. Thus, the transducer 150 may incorporate one or more of the features of the transducers 100, 100', 100", 100''', and/or 100''''. For example, the AFM 170 may be above the pinned layer 162 as shown or below the pinned layer 162. Similarly, the pinned layer 162 is shown as extending farther than the free layer 166. However, in another embodiment, the sensor 160 could have another configuration.

The magnetoresistive read transducer also includes an AFM tab 170. The AFM tab 170 is adjacent to the pinned layer 162 and recessed from the ABS. The AFM tab 170 is shown on the pinned layer 162. However, in another embodiment, the AFM tab 170 may be below the pinned layer 162. In some embodiments, the AFM tab 170 is recessed from the ABS by at least ten nanometers. In other embodiments, the AFM tab 170 may be recessed by at least fifty nanometers. The AFM tab 170 may have sufficient volume and pinning strength for thermal stability as well as to perform the desired functions. In some embodiments, for example, the thickness of the AFM tab 170 may, for example, be at least fifty Angstroms. The AFM tab 170 may also be spaced apart from the back edge of the free layer 166 by a distance. In some embodiments, this distance is at least twenty and not more than forty nanometers. However, in other embodiments, the distance between the back of the free layer 166 (away from the ABS) to the front surface of the AFM tab 170 may vary. Further, the AFM tab 170 only extends as far in the track width direction as the pinned layer 160.

The AFM tab 170 is used to stabilize the pinned layer 162. Although termed an AFM tab, in some embodiments, a material other than an AFM material might be used. In some embodiments, the AFM tab 170 may have sufficient volume and pinning strength to pin the magnetization of the pinned layer 162 in the desired direction. However, in the embodiment shown, the pinned layer 162 is extended beyond the free layer 166 in the stripe height direction and may have an aspect ratio of greater than 2. As a result, the pinned layer 162 may not require pinning by the AFM tab 170. For example, a pinned layer 162 that is a SAF structure may be stable. In such embodiments, the AFM tab 170 may simply function to prevent the pinned layer 162 from being reversed during use and/or manufacturing (e.g. due to lapping). In some such embodiments, the AFM tab 170 may also act to restore the pinned layer 162 to its desired state if the pinned layer 162 undergoes an undesired reversal during operation. However, as described above, in some embodiments, the AFM tab 170 can act to pin the magnetization of the pinned layer 162.

Using the AFM tab 170, the pinned layer 162 can be made thermally stable. The AFM tab 170 may also not only stabilize the magnetization of the pinned layer 162 against reversal, but may also allow the desired state of the magnetization to be restored. In some embodiments, the AFM tab 170 may have sufficient volume and coupling to the pinned layer 162 to pin the magnetization of the pinned layer 162. The pinned layer 162 may be stabilized in the desired direction. This may be achieved with a reduced shield-to-shield spacing. For example, in some embodiments, the shield-to-shield spacing may be as low as sixteen nanometers. In some such embodiments, the shield-to-shield spacing may be as low as thirteen nanometers. In other embodiments, a different shield-to-shield spacing (lower or higher) may be achieved. Thus, a read transducer 150 suitable for use at higher magnetic recording densities may be provided.

The transducer 150 thus shares one or more of the benefits of the transducers 100, 100', 100", 100''', and/or 100''''. The pinned layer 162' can be made more stable using the AFM tab 170. Because the AFM tab 170 is recessed from the ABS, this stabilization can be achieved with a reduced shield-to-shield spacing. For example, in some embodiments, the shield-to-shield spacing may be analogous to that described for the transducer 100, 100', 100", 100''', and/or 100''''. Thus, a read transducer 150 suitable for use at higher magnetic recording densities may be provided.

Figure 8:
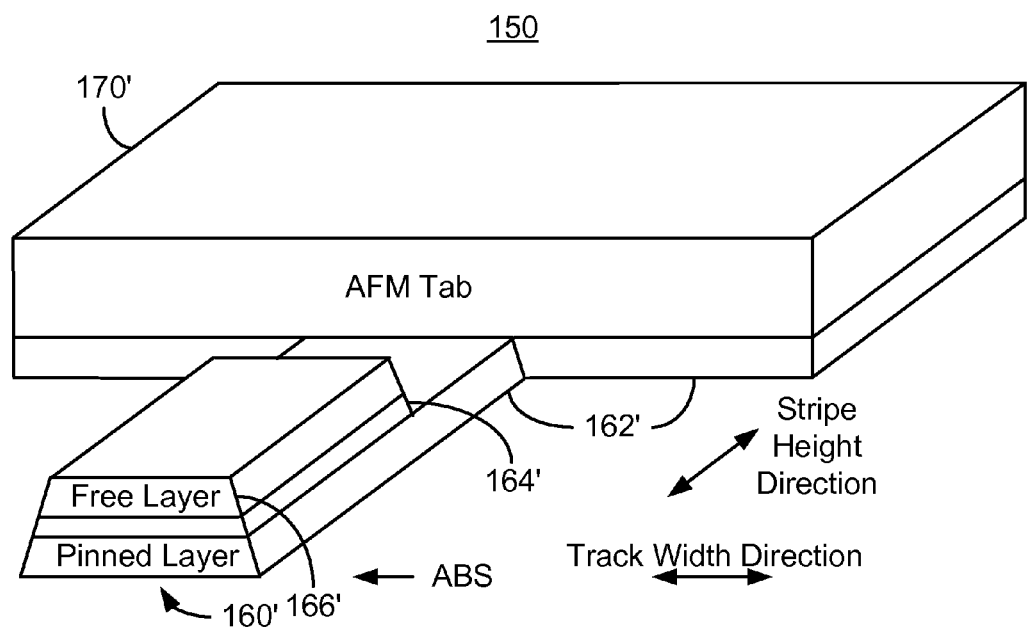
FIG. 8 is a perspective view of an exemplary embodiment of a portion of a magnetic recording read transducer.

FIG. 8 depicts a perspective view of an exemplary embodiment of a portion of a magnetic read transducer 150'. For clarity, FIG. 8 is not to scale. The read transducer 150' may be part of a read head or may be part of a merged head that also includes a write transducer. The head of which the read transducer 150' is a part is part of a disk drive having a media, a slider and the head coupled with the slider. Further, the magnetic read transducer 150' corresponds to the magnetic read transducer 150 and, therefore, may include one or more features of the magnetic transducers 100, 100', 100", 100''', and/or 100''''. Similar components have analogous labels. The magnetic transducer 150' includes AFM tab 170' and sensor 160' having pinned layer 162', nonmagnetic spacer layer 164', and free layer 166' that correspond to AFM tab 170 and sensor 160 having pinned layer 162, nonmagnetic spacer layer 164, and free layer 166, respectively. Thus, the components 162', 164', 166', and 170' have a similar structure and function to the components 162, 164, 166, and 170, respectively.

In addition to extending beyond the free layer 166' in the stripe height direction, the back portion of the pinned layer 162' has a larger width in the track width direction. In some embodiments, the total stripe height of the pinned layer 162' (from the ABS to the back of the pinned layer 162') divided the track width of the pinned layer 162' at the ABS is greater than two. Similarly, the AFM tab 170' has a width in the track width direction that at least matches that of the back portion of the pinned layer 162'. The AFM tab 170' is also adjacent to the pinned layer 162' and recessed from the ABS. Although the AFM tab 170 is shown as residing on top of the pinned layer 162', in another embodiment, the AFM tab 170' may be below the pinned layer 162'. The geometry and function of the AFM tab 170' may be analogous to that of the AFM tab 170. In some embodiments, the AFM tab 170' is recessed from the ABS a distance analogous to the AFM tab 170. The AFM tab 170' may have sufficient volume for thermal stability as well as to perform the desired functions.

The AFM tab 170' is used to stabilize the pinned layer 162'. Although termed an AFM tab, in some embodiments, a material other than an AFM material might be used. In some embodiments, the AFM tab 170' may have sufficient volume and pinning strength to pin the magnetization of the pinned layer 162' in the desired direction. However, in the embodiment shown in FIG. 8, the pinned layer 162' extends beyond the free layer 166' in the stripe height direction. As a result, the pinned layer 162' may not require pinning by the AFM tab 170'. In some embodiments, therefore, the AFM tab 170' may simply function to prevent the pinned layer 162' from being reversed during use and/or fabrication. The AFM tab 170' may also restore the pinned layer 162' to its desired state if the pinned layer 162' undergoes an undesired reversal.

The transducer 150' shares the benefits of the transducer 100. The pinned layer 162' can be made more stable. The AFM tab 170' may not only stabilize the magnetization of the pinned layer 162' against reversal, but may also allow the desired state of the magnetization to be restored. In some embodiments, the AFM tab 170' may have sufficient volume and coupling to the pinned layer 162' to pin the magnetization of the pinned layer 162'. This stabilization may be achieved with a reduced shield-to-shield spacing. Thus, a read transducer 150' suitable for use at higher magnetic recording densities may be provided.

Figure 9:
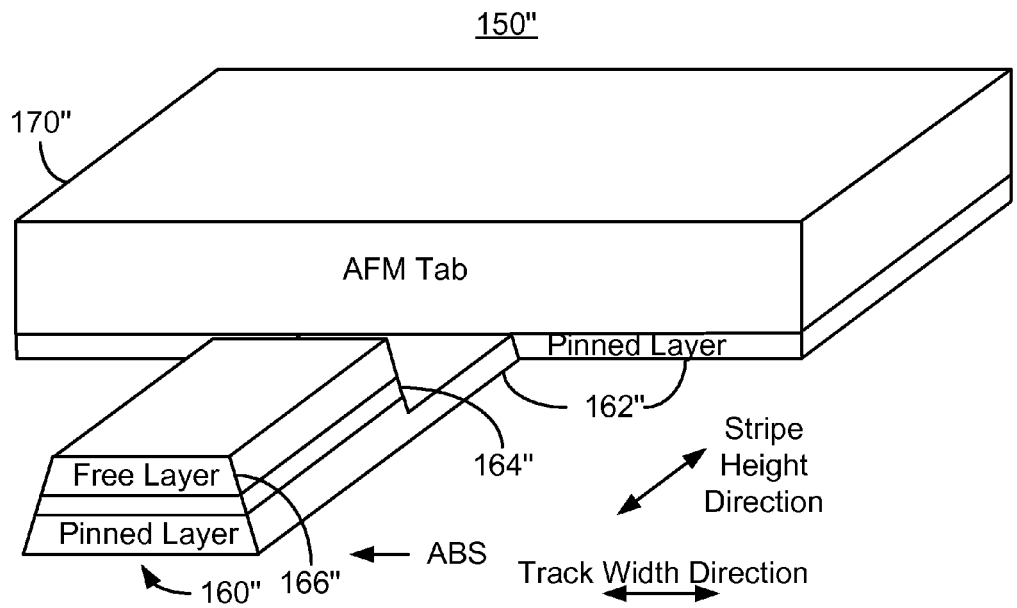
FIG. 9 is a perspective view of an exemplary embodiment of a portion of a magnetic recording read transducer.

FIG. 9 depicts a perspective view of an exemplary embodiment of a portion of a magnetic read transducer 150". For clarity, FIG. 9 is not to scale. The read transducer 150" may be part of a read head or may be part of a merged head that also includes a write transducer. The head of which the read transducer 150" is a part is part of a disk drive having a media, a slider and the head coupled with the slider. Further, the magnetic read transducer 150" corresponds to the magnetic read transducer 150 and/or 150'. Thus, the magnetic read transducer 150" may also include one or more features of the magnetic transducers 100, 100', 100", 100'", and/or 100"". Similar components have analogous labels. The magnetic transducer 150" includes AFM tab 170" and sensor 160" having pinned layer 162", nonmagnetic spacer layer 164", and free layer 166" that correspond to AFM tab 170/170' and sensor 160/160' having pinned layer 162/162', nonmagnetic spacer layer 164/164', and free layer 166/166', respectively. Thus, the components 162", 164", 166", and 170" have a similar structure and function to the components 162/162', 164/164', 166/166', and 170/170', respectively.

The pinned layer 162" extends beyond the free layer 166" in the stripe height direction. The back portion of the pinned layer 162" has a larger width in the track width direction. In some embodiments, the total stripe height of the pinned layer 162" (from the ABS to the back of the pinned layer 162") divided the track width of the pinned layer 162" at the ABS is greater than two. However, the thickness of the pinned layer 162" varies. More particularly, the pinned layer 162" is thicker proximate to the free layer 166". In the embodiment shown, the pinned layer 162" has a step in its thickness near the edge of the free layer 166" that is distal from the ABS. However, in other embodiments, the thickness of the pinned layer 162" may change at another location and/or in another fashion.

The AFM tab 170" has a width in the track width direction that matches that of the back portion of the pinned layer 162". The AFM tab 170" also adjacent to the pinned layer 162", recessed from the ABS, and otherwise analogous to the AFM tab 170/170'. Although the AFM tab 170" is shown as residing on top of the pinned layer 162", in another embodiment, the AFM tab 170" may be below the pinned layer 162". In some embodiments, the AFM tab 170" is recessed from the ABS a distance analogous to the AFM tab 170/170'. The AFM tab 170" may have sufficient volume and pinning strength for thermal stability as well as to perform the desired functions.

The transducer 150" shares the benefits of the transducer 150 and/or 150'. The pinned layer 162" can be made more stable. The AFM tab 170" may not only stabilize the magnetization of the pinned layer 162" against reversal, but may also allow the desired state of the magnetization to be restored. In some embodiments, the AFM tab 170" may have sufficient volume and coupling to the pinned layer 162" to pin the magnetization of the pinned layer 162". This stabilization may be achieved with a reduced shield-to-shield spacing. Thus, a read transducer 150" suitable for use at higher magnetic recording densities may be provided.

Figure 10:
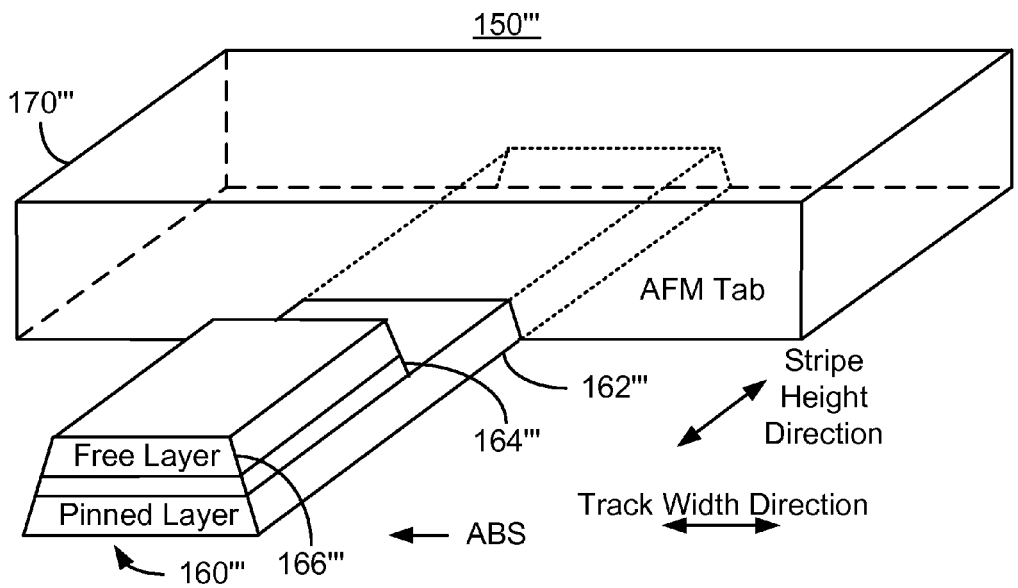
FIG. 10 is a perspective view of an exemplary embodiment of a portion of a magnetic recording read transducer.

FIG. 10 depicts a perspective view of an exemplary embodiment of a portion of a magnetic read transducer 150'". For clarity, FIG. 10 is not to scale. The read transducer 150'" may be part of a read head or may be part of a merged head that also includes a write transducer. The head of which the read transducer 150'" is a part is part of a disk drive having a media, a slider and the head coupled with the slider. Further, the magnetic read transducer 150'" corresponds to the magnetic read transducer 150, 150', and/or 150". Thus, the magnetic read transducer 150'" may also incorporate one or more features of the magnetic transducers 100, 100', 100", 100'", and/or 100"". Similar components have analogous labels. The magnetic transducer 150'" includes AFM tab 170'" and sensor 160'" having pinned layer 162'", nonmagnetic spacer layer 164'", and free layer 166'" that correspond to AFM tab 170/170'/170" and sensor 160/160'/160" having pinned layer 162/162'/162", nonmagnetic spacer layer 164/164'/164", and free layer 166/166'/166", respectively. Thus, the components 162'", 164'", 166'", and 170'" have a similar structure and function to the components 162/162'/162", 164/164'/164", 166/166'/166", and 170/170'/170", respectively.

The pinned layer 162'" extends beyond the free layer 166'" in the stripe height direction and may have an aspect ratio of greater than two. However, the width of the pinned layer 162'" in the track width direction does not significantly change distal from the ABS. The AFM tab 170" has a width in the track width direction that is larger than that of the back portion of the pinned layer 162'". The AFM tab 170'" also adjacent to the pinned layer 162'", recessed from the ABS, and otherwise analogous to the AFM tab 170/170'/170". Although the AFM tab 170'" is shown as residing on top of the pinned layer 162'", in another embodiment, the AFM tab 170'" may be below the pinned layer 162'". In such an embodiment, the pinned layer 162'" may simply reside on the top, flat surface of the AFM tab 170'". In some embodiments, the AFM tab 170'" is recessed from the ABS a distance analogous to the AFM tab 170/170'/170". The AFM tab 170'" may have sufficient volume and pinning strength for thermal stability as well as to perform the desired functions. Although the portion of the AFM tab 170'" that is not near the pinned layer 162'" in the track width direction may not contribute to the stabilization of the pinned layer 162'", the additional AFM material may aid in thermally stabilizing the AFM tab 170'".

The transducer 150'" shares the benefits of the transducer 150, 150' and/or 150". The pinned layer 162'" can be made more stable. The AFM tab 170'" may not only stabilize the magnetization of the pinned layer 162" against reversal, but may also allow the desired state of the magnetization to be restored. In some embodiments, the AFM tab 170'" may have sufficient volume and coupling to the pinned layer 162'" to pin the magnetization of the pinned layer 162'". This stabilization may be achieved with a reduced shield-to-shield spacing. Thus, a read transducer 150'" suitable for use at higher magnetic recording densities may be provided.

Figure 11:
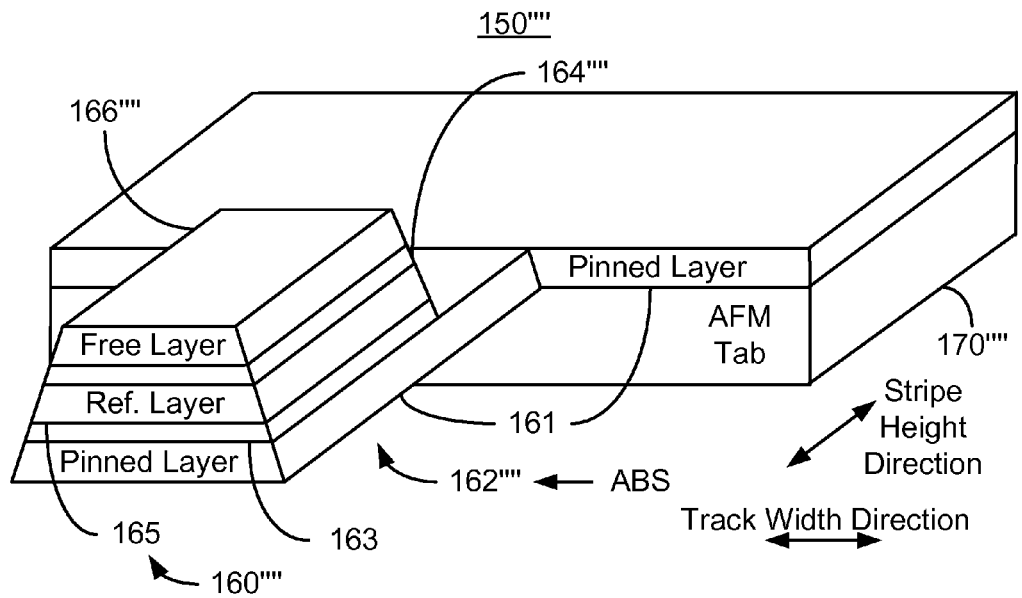
FIG. 11 is a perspective view of an exemplary embodiment of a portion of a magnetic recording read transducer.

FIG. 11 depicts a perspective view of an exemplary embodiment of a portion of a magnetic read transducer 150"". For clarity, FIG. 11 is not to scale. The read transducer 150"" may be part of a read head or may be part of a merged head that also includes a write transducer. The head of which the read transducer 150"" is a part is part of a disk drive having a media, a slider and the head coupled with the slider. Further, the magnetic read transducer 150"" corresponds to the magnetic read transducer 150, 150', 150", and/or 150'". Thus, the magnetic read transducer 150"" may also include one or more features of the magnetic transducers 100, 100', 100", 100'", and/or 100"". Similar components have analogous labels. The magnetic transducer 150"" includes AFM tab 170"" and sensor 160"" having pinned layer 162"", nonmagnetic spacer layer 164"", and free layer 166"" that correspond to AFM tab 170/170'/170"/170'" and sensor 160/160'/160"/160'" having pinned layer 162/162'/162"/162'", nonmagnetic spacer layer 164/164'/164"/164'", and free layer 166/166'/166"/166'", respectively. Thus, the components 162"", 164"", 166"", and 170"" have a similar structure and function to the components 162/162'/162"/162'", 164/164'/164"/164'", 166/166'/166"/166'", and 170/170'/170"/170'", respectively.

The pinned layer 162"" extends beyond the free layer 166"" in the stripe height direction. In some embodiments, the total stripe height of the pinned layer 162"" (from the ABS to the back of the pinned layer 162'") divided the track width of the pinned layer 162"" at the ABS is greater than two. However, the width of the pinned layer 162"" in the track width direction is significantly larger distal from the ABS. The AFM tab 170'" has a width in the track width direction that corresponds to the wider, back portion of the pinned layer 162"". The AFM tab 170"" also adjacent to the pinned layer 162"", recessed from the ABS, and otherwise analogous to the AFM tab 170/170'/170"/170'". However, in the embodiment shown, the AFM tab 170"" is below the pinned layer 162. Thus, if desired, the free layer 166"" and the nonmagnetic spacer layer 164"" may be extended in a similar manner as the pinned layer 162"". In some embodiments, the AFM tab 170"" is recessed from the ABS a distance analogous to the AFM tab 170/170'/170"/170'". The AFM tab 170"" may have sufficient volume and pinning strength for thermal stability as well as to perform the desired functions.

In addition, the pinned layer 162"" includes multiple layers. More specifically, the pinned layer 162"" shown is a SAF structure including ferromagnetic pinned layer 161, nonmagnetic layer 163, and reference layer 165. In the embodiment shown, the reference layer 165 and nonmagnetic layer 163 do not extend beyond the free layer 166"" in the stripe height direction. Further, the reference layer 165 and nonmagnetic layer 163 do not have a larger width in the track width direction distal from the ABS. However, in other embodiments, the widths of the layers 163 and 165 may change in the track width direction. In other embodiments, one or both of the layers 163 and 165 may extend further in the stripe height direction than the free layer 166"".

The transducer 150"" shares the benefits of the transducer 150, 150', 150", and/or 150'". The pinned layer 162"" can be made more stable. The AFM tab 170"" may not only stabilize the magnetization of the pinned layer 162" against reversal, but may also allow the desired state of the magnetization to be restored. In some embodiments, the AFM tab 170"" may have sufficient volume and coupling to the pinned layer 162"" to pin the magnetization of the pinned layer 162"". This stabilization may be achieved with a reduced shield-to-shield spacing. Thus, a read transducer 150"" suitable for use at higher magnetic recording densities may be provided.

Figure 12:
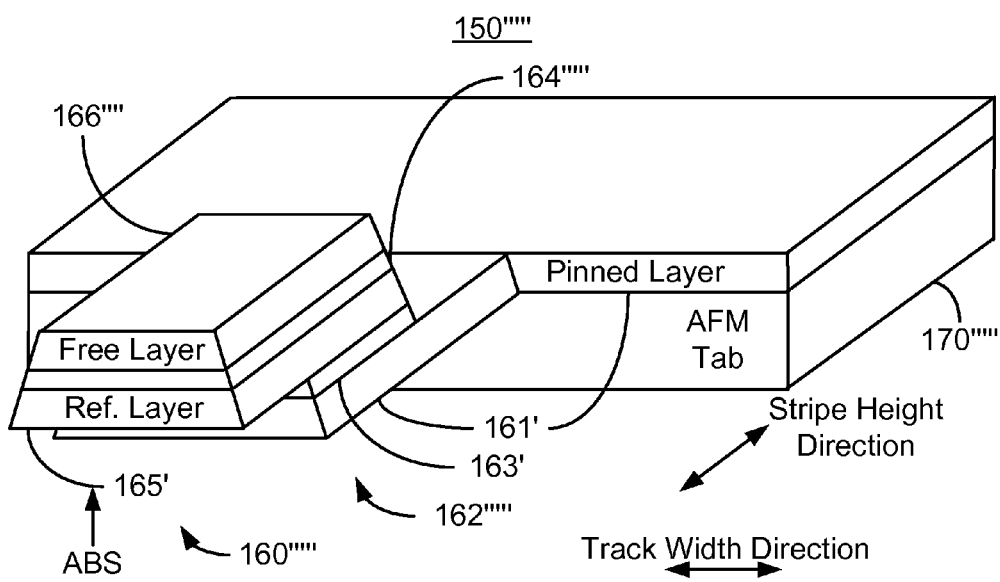
FIG. 12 is a perspective view of an exemplary embodiment of a portion of a magnetic recording read transducer.

FIG. 12 depicts a perspective view of an exemplary embodiment of a portion of a magnetic read transducer 150'"". For clarity, FIG. 12 is not to scale. The read transducer 150'"" may be part of a read head or may be part of a merged head that also includes a write transducer. The head of which the read transducer 150'"" is a part is part of a disk drive having a media, a slider and the head coupled with the slider. Further, the magnetic read transducer 150'"" corresponds to the magnetic read transducer 150, 150', 150", 150'", and/or 150"". Thus, the magnetic read transducer 150'"" may also incorporate one or more features of the magnetic transducers 100, 100', 100", 100'", and/or 100"". Similar components have analogous labels. The magnetic transducer 150'"" includes AFM tab 170'"" and sensor 160'"" having pinned layer 162'"", nonmagnetic spacer layer 164'"", and free layer 166'"" that correspond to AFM tab 170/170'/170"/170'"/170"" and sensor 160/160'/160"/160'"/160"" having pinned layer 162/162'/162"/162'"/162"", nonmagnetic spacer layer 164/164'/164"/164'"/164"", and free layer 166/166'/166"/166'"/166"", respectively. Thus, the components 162'"", 164'"", 166'"", and 170'"" have a similar structure and function to the components 162/162'/162"/162'"/162"", 164/164'/164"/164'"/164"", 166/166'/166"/166'"/166"", and 170/170'/170"/170'"/170"", respectively. Further, the pinned layer 162'"" is a SAF structure including a ferromagnetic pinned layer 161', nonmagnetic layer 163', and reference layer 165' that are analogous to the ferromagnetic pinned layer 161, nonmagnetic layer 163, and reference layer 165, respectively.

The pinned layer 162'"" extends beyond the free layer 166'"" in the stripe height direction. In some embodiments, the total stripe height of the pinned layer 162'"" (from the ABS to the back of the pinned layer 162'"") divided the track width of the pinned layer 162'"" at the ABS is greater than two. However, the width of the pinned layer 162'"" in the track width direction is significantly larger distal from the ABS. The AFM tab 170'"" has a width in the track width direction that corresponds to the wider, back portion of the pinned layer 162'"". The AFM tab 170'"" also adjacent to the pinned layer 162'"", recessed from the ABS, and otherwise analogous to the AFM tab 170/170'/170"/170'". However, in the embodiment shown, the AFM tab 170'"" is below the pinned layer 162. Thus, if desired, the free layer 166'"" and the nonmagnetic spacer layer 164'"" may be extended in a similar manner as the pinned layer 162'"". In some embodiments, the AFM tab 170'"" is recessed from the ABS a distance analogous to the AFM tab 170/170'/170"/170'"/170"". The AFM tab 170'"" may have sufficient volume and pinning strength for thermal stability as well as to perform the desired functions.

In addition, the ferromagnetic pinned layer 161' of the pinned layer 162'"" is recessed from the ABS. Further, the nonmagnetic layer 163' is also recessed from the ABS. However, sufficient overlap in the stripe height and track width directions remains between the ferromagnetic pinned layer 161' and the reference layer 165' that the layers 161' and 165' may be strongly antiferromagnetically coupled. Because the pinned layer 161' is recessed from the ABS, both the pinning layer/AFM layer and the pinned layer 161' may be omitted from the portion of the transducer 150'"" occupying the ABS. Thus, the shield-to-shield spacing may be further decreased.

The transducer 150'"" shares the benefits of the transducer 150, 150', 150", 150'", and/or 150"". The pinned layer 162'"" can be made more stable. The AFM tab 170'"" may not only stabilize the magnetization of the pinned layer 162"" against reversal, but may also allow the desired state of the magnetization to be restored. In some embodiments, the AFM tab 170'"" may have sufficient volume and coupling to the pinned layer 162'"" to pin the magnetization of the pinned layer 162'"". This stabilization may be achieved with a reduced shield-to-shield spacing. Thus, a read transducer 150'"" suitable for use at higher magnetic recording densities may be provided.

Various arrangements have been described with respect to the magnetic read transducers 100, 100', 100", 100'", 100"", 150, 150', 150", 150'", 150"", and 150'"". Various features of one or more of these magnetic transducers 100, 100', 100", 100'", 100"", 150, 150', 150", 150'", 150"", and/or 150'"" may be incorporated into a particular magnetic transducer. Thus, various benefits of one or more of the magnetic transducers 100, 100', 100", 100'", 100"", 150, 150', 150", 150'", 150"", and 150'"" may be achieved.

Figure 13:
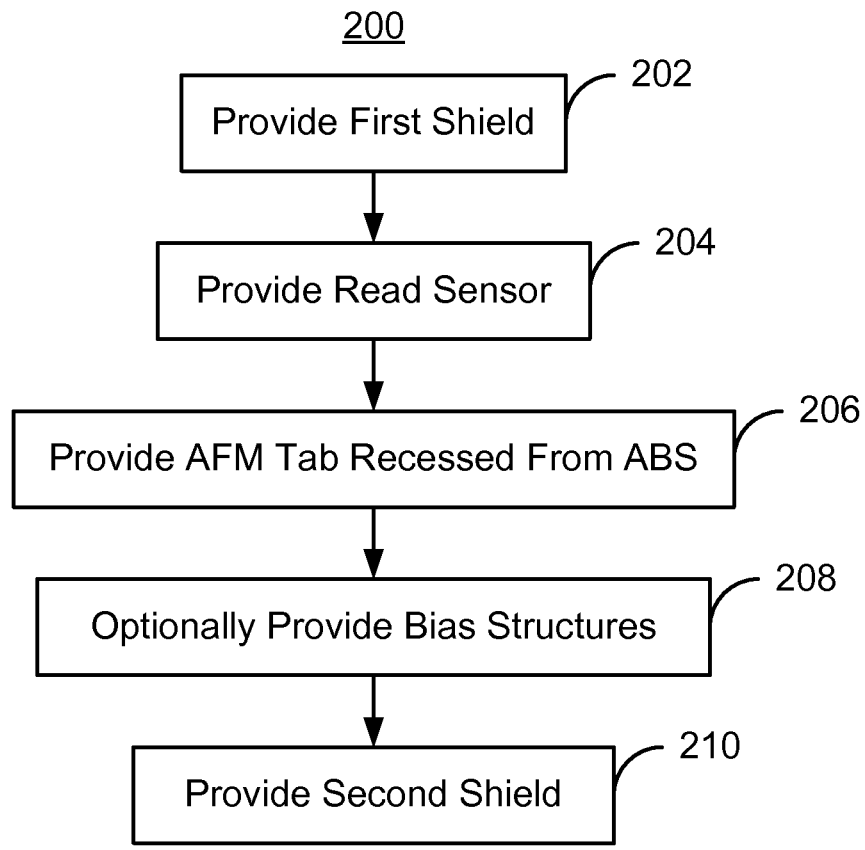
FIG. 13 is flow chart depicting an exemplary embodiment of a method for fabricating a portion of a magnetic recording read transducer.

FIG. 13 is an exemplary embodiment of a method 200 for providing a read transducer utilizing an AFM tab. For simplicity, some steps may be omitted, interleaved, and/or combined. The method 200 is also described in the context of providing a single recording transducer 100. However, the method 200 may be used to fabricate multiple transducers at substantially the same time. The method 200 may also be used to fabricate other transducers including but not limited to any combination of 100, 100', 100", 100'", 100"", 150, 150', 150", 150'", 150"", and/or 150'"". The method 200 is also described in the context of particular layers. A particular layer may include multiple materials and/or multiple sub-layers. The method 200 also may start after formation of other portions of the magnetic recording transducer.

The shield 102 is provided, via step 202. Step 202 typically includes depositing a large high permeability layer. The shield 102 typically extends significantly further in the track width direction than the read sensor 110 or any bias structures 106. The sensor stack 110 is provided, via step 204. Step 204 typically includes depositing the layers for the sensor 110. The sensor 110 may also be defined from the sensor stack in at least the track width direction in step 204. In some embodiments, the read sensor 110 is defined performed using an ion mill. In some embodiments, the sensor 110 is also defined in the stripe height direction. In some embodiments, the at least some of the layers for the sensor are not completely milled through to provide an extended layers. For example, the pinned layer 112 may not be milled through in the stripe height direction or may be milled at a different distance from the ABS. Thus, an extended pinned layer may be provided. Similarly, the pinned layer 112 may be configured to be larger in the track width direction distal from the ABS, for example in a manner analogous to the pinned layer 162'.

The AFM tab 120 that is recessed from the ABS may be provided, via step 206. In some embodiments, step 204 is performed after step 206. In such embodiments, the films for the read sensor stack are deposited after the AFM tab 120 is provided. In such embodiments, the pinned layer 112 may be deposited on and reside on the AFM tab 120. In other embodiments, step 204 is performed before step 206. In such embodiments, the AFM tab 120 is on the pinned layer 112.

The bias structures 106 may optionally be provided in step 208. Step 208 may include depositing hard bias or other analogous structures. The top shield 108 may then be provided, via step 210. Formation of the transducer 150 may then be completed.

Using the method 200, the transducers 100, 100', 100", 100''', 100'''', 150, 150', 150", 150''', 150'''', and/or 150''''' may be fabricated. Thus, the benefits of one or more of the transducers 100, 100', 100", 100''', 100'''', 150, 150', 150", 150''', 150'''', and/or 150''''' may be achieved.

Figure 14:
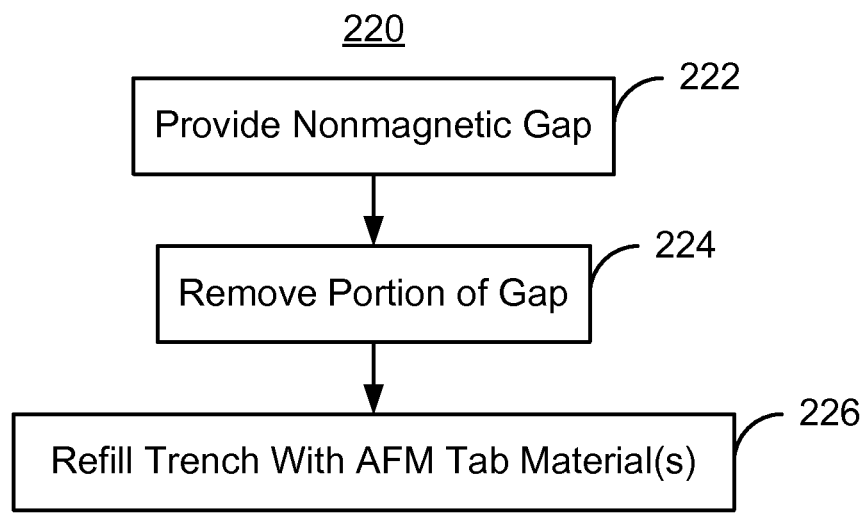
FIG. 14 is flow chart depicting an exemplary embodiment of a method for fabricating an AFM tab for a magnetic recording read transducer.

FIG. 14 depicts an exemplary embodiment of a method 220 for providing the AFM tab. For simplicity, some steps may be omitted, interleaved, and/or combined. The method 220 is also described in the context of providing a single recording transducer 100'. However, the method 220 may be used to fabricate multiple transducers at substantially the same time. The method 220 may also be used to fabricate other transducers including but not limited to any combination of 100, 100', 100", 100''', 100'''', 150, 150', 150", 150''', 150'''', and/or 150'''''. The method 200 is also described in the context of particular layers. A particular layer may include multiple materials and/or multiple sub-layers. The method 220 also may start after formation of other portions of the magnetic recording transducer.

A nonmagnetic gap layer is deposited on the first shield 102, via step 222. In some embodiments, step 222 includes depositing an insulator such as aluminum oxide. However, in other embodiments, other material(s) may be used. A portion of the gap layer is removed, via step 224. Thus, a trench is formed in the nonmagnetic gap layer that corresponds to the size and location of the AFM tab 120'. In some embodiments, step 224 includes providing a mask having an aperture corresponding to the trench, then removing the portion of the nonmagnetic gap layer using an appropriate removal process. For example, for aluminum oxide, an aluminum oxide reactive ion etch (RIE) may be used.

The materials for the AFM tab 120' are deposited, via step 226. In some embodiments, step 226 includes plating or otherwise depositing the materials. Step 226 may also include planarizing the transducer or otherwise removing excess AFM tab materials external to the trench. Thus, the AFM tab 120' may be formed.

Using the method 220, the transducers 100, 100', 100", 100''', 100'''', 150, 150', 150", 150''', 150'''', and/or 150''''' may be fabricated. In particular, the AFM tab 120' may be provided. Note that the method 222 is used for those transducers in which the pinned layer resides on the AFM tab 120'. Thus, the benefits of one or more of the transducers 100, 100', 100", 100''', 100'''', 150, 150', 150", 150''', 150'''', and/or 150''''' may be achieved.

Figure 15:
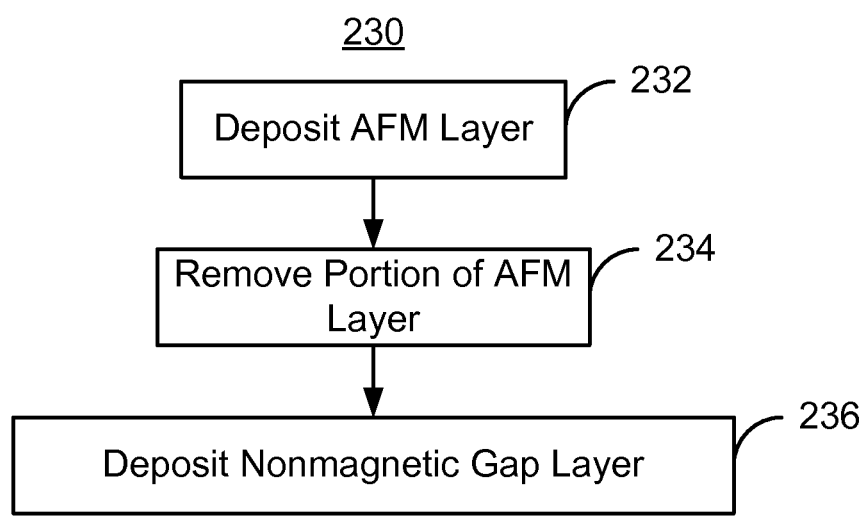
FIG. 15 is flow chart depicting an exemplary embodiment of a method for fabricating an AFM tab for a magnetic recording read transducer.

FIG. 15 depicts an exemplary embodiment of a method 230 for providing the AFM tab. For simplicity, some steps may be omitted, interleaved, and/or combined. The method 230 is also described in the context of providing a single recording transducer 100. However, the method 230 may be used to fabricate multiple transducers at substantially the same time. The method 230 may also be used to fabricate other transducers including but not limited to any combination of 100, 100', 100", 100''', 100'''', 150, 150', 150", 150''', 150'''', and/or 150'''''. The method 200 is also described in the context of particular layers. A particular layer may include multiple materials and/or multiple sub-layers. The method 230 also may start after formation of other portions of the magnetic recording transducer.

The materials for the AFM tab 120 are deposited, via step 232. In some embodiments, step 232 includes plating or otherwise depositing the materials.

A portion of the AFM tab materials are removed, via step 234. Thus, the AFM tab 120 may be formed. A nonmagnetic gap layer is deposited on the first shield 102 as well as other components, via step 236. In some embodiments, step 236 includes depositing an insulator such as aluminum oxide. However, in other embodiments, other material(s) may be used. A planarization such as a CMP or other process may also be used to provide a substantially flat surface for subsequent processing.

Using the method 220, the transducers 100, 100', 100", 100''', 100'''', 150, 150', 150", 150''', 150'''', and/or 150''''' may be fabricated. In particular, the AFM tab 120 may be provided. Note that the method 230 may be used for those transducers in which the pinned layer resides on the AFM tab 120 or in which the AFM tab is on the pinned layer. Thus, the benefits of one or more of the transducers 100, 100', 100", 100''', 100'''', 150, 150', 150", 150''', 150'''', and/or 150''''' may be achieved.

We claim:

1. A magnetic read transducer having an air-bearing surface (ABS) comprising:
   a first shield;
   a read sensor stack including a pinned layer, a spacer layer, and a free layer, the spacer layer being nonmagnetic and residing between the pinned layer and the free layer, a portion of the read sensor stack residing at the ABS, the free layer extending a first distance from the ABS, the pinned layer extending a second distance from the ABS, the first distance being less than the second distance;
   an antiferromagnetic (AFM) tab recessed from the ABS and adjacent to a portion of the pinned layer; and
   a second shield, the read sensor residing between the first shield and the second shield.

2. The magnetic read transducer of claim 1 wherein the AFM tab is recessed at least ten nanometers from the ABS.

3. The magnetic read transducer of claim 2 wherein the AFM tab is recessed at least fifty nanometers from the ABS.

4. The magnetic read transducer of claim 1 wherein the AFM tab has a thickness of at least fifty Angstroms.

5. The magnetic read transducer of claim 1 wherein the read sensor stack further includes an AFM layer.

6. The magnetic read transducer of claim 1 wherein the portion of the read sensor stack at the ABS is free of AFM materials.

7. The magnetic read transducer of claim 1 wherein a first portion of the pinned layer less than the first distance from the ABS has a first thickness, a second portion of the pinned layer greater than the first distance from the ABS has a second thickness different from the first thickness.

8. The magnetic transducer of claim 1 wherein the spacer layer extends a third distance from the ABS, the third distance being different from the first distance.

9. The magnetic transducer of claim 1 wherein pinned layer has a bottom surface and a top surface closer to the free layer than the bottom surface, and wherein the AFM tab adjoins a portion of the bottom surface.

10. The magnetic transducer of claim 1 wherein pinned layer has a bottom surface and a top surface closer to the free layer than the bottom surface, and wherein the AFM tab adjoins a portion of the top surface.

11. The magnetic transducer of claim 1 wherein the free layer has a track width and wherein the AFM tab has a width greater than the track width.

12. The magnetic transducer of claim 1 wherein the pinned layer is a synthetic antiferromagnet including a first ferromagnetic layer, a second ferromagnetic layer, and a nonmagnetic spacer layer between the first ferromagnetic layer and second ferromagnetic layer.

13. A disk drive comprising:
at least one disk;
at least one slider including at least one magnetic read transducer having an air-bearing surface (ABS), each of the at least one magnetic read transducer including a first shield, a read sensor stack, an antiferromagnetic (AFM) tab, and a second shield, the read sensor stack including a pinned layer, a spacer layer, and a free layer, the spacer layer being nonmagnetic and residing between the pinned layer and the free layer, a portion of the read sensor stack residing at the ABS, the AFM tab being recessed from the ABS and adjoining a portion of the pinned layer, the read sensor residing between the first shield and the second shield, the free layer extending a first distance from the ABS, the pinned layer extending a second distance from the ABS, the first distance being less than the second distance.

14. A method for providing a magnetic read transducer having an air-bearing surface (ABS) comprising:
providing a first shield;
providing a read sensor stack including a pinned layer, a spacer layer, and a free layer, the spacer layer being nonmagnetic and residing between the pinned layer and the free layer, a portion of the read sensor stack residing at the ABS, the free layer extending a first distance from the ABS, the pinned layer extending a second distance from the ABS, the first distance being less than the second distance;
providing an antiferromagnetic (AFM) tab recessed from the ABS and adjoining a portion of the pinned layer; and
providing a second shield, the read sensor residing between the first shield and the second shield.

15. The method of claim 14 wherein the step of providing the AFM tab further includes:
providing a nonmagnetic gap on the first shield;
removing a portion of the nonmagnetic gap recessed from the ABS in a location corresponding to the AFM tab; and
depositing the AFM tab, the AFM tab residing between the portion of the pinned layer and the first shield.

16. The method of claim 15 wherein the step of providing the read sensor stack further includes:
depositing a plurality of films after the step of providing the AFM tab, the plurality of films including at least one pinned layer film corresponding to the pinned layer, depositing a spacer layer film corresponding to the spacer layer, and depositing at least one free layer film corresponding to the free layer; and
defining the read sensor stack from the plurality of films.

17. The method of claim 14 wherein the step of providing the AFM tab further includes:
depositing an AFM layer;
removing a portion of the AFM layer, a remaining portion of the AFM layer corresponding to the AFM tab;
depositing a nonmagnetic layer, the nonmagnetic layer refilling a region around the AFM tab.

18. The method of claim 17 wherein the step of providing the read sensor stack further includes:
depositing a plurality of films after the step of providing the AFM tab, the plurality of films including at least one pinned layer film corresponding to the pinned layer, depositing a spacer layer film corresponding to the spacer layer, and depositing at least one free layer film corresponding to the free layer; and
defining the read sensor stack from the plurality of films.

19. The method of claim 14 wherein the step of providing the AFM tab further includes:
depositing the AFM tab on the portion of the pinned layer.

20. A magnetic read transducer having an air-bearing surface (ABS) comprising:
a first shield;
a read sensor stack including a pinned layer, a spacer layer, and a free layer, the spacer layer being nonmagnetic and residing between the pinned layer and the free layer, a portion of the read sensor stack residing at the ABS, the pinned layer having a bottom surface and a top surface closer to the free layer than the bottom surface;
an antiferromagnetic (AFM) tab recessed from the ABS and adjoining a portion of the top surface of the pinned layer such that the free layer is closer to the ABS than the AFM tab; and
a second shield, the read sensor residing between the first shield and the second shield.

* * * * *